Nov. 14, 1933.                H. H. FANTE                1,934,702
                                 CLAMP
                            Filed Jan. 26, 1933
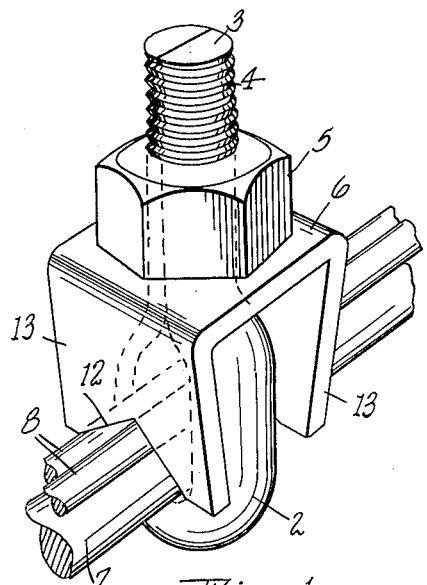
Fig. 1
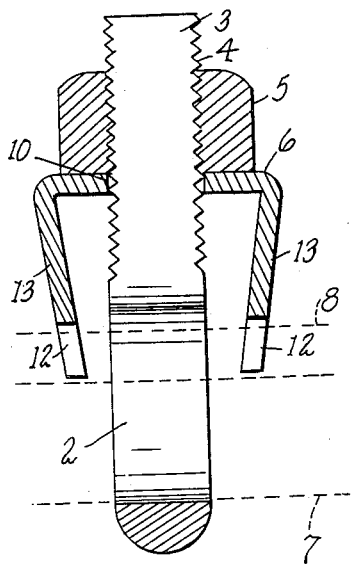
Fig. 2
Fig. 7
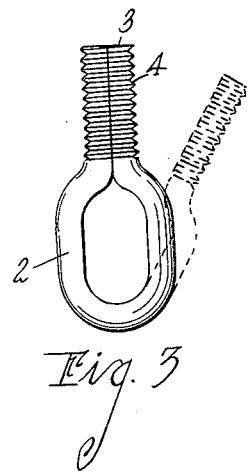
Fig. 3
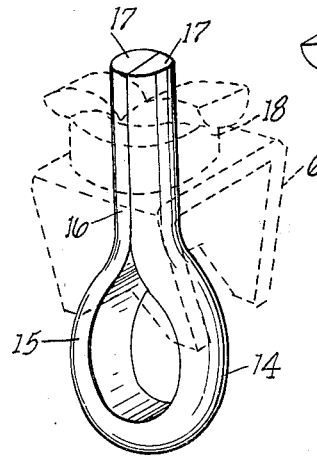
Fig. 4
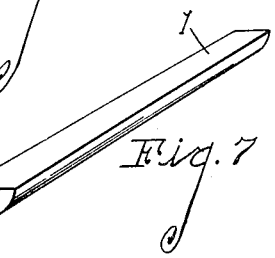
Fig. 5
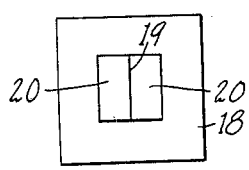
Fig. 6
INVENTOR
Harry H. Fante
BY
Chappell Earl
ATTORNEYS Patented Nov. 14, 1933

1,934,702

UNITED STATES PATENT OFFICE 1,934,702

CLAMP

Harry H. Fante, Detroit, Mich., assignor to L. A. Young Spring and Wire Corporation, Detroit, Mich.

Application January 26, 1933. Serial No. 653,648

3 Claims. (Cl. 24—125)

The main objects of this invention are:

First, to provide an improved clamp for guy wires and the like.

Second, to provide a clamp of this character, which is held in assembled relation by means of a single collar or nut.

Third, to provide a clamp of this character, which is simple and economical in its parts and efficient and effective in operation.

Objects relating to details and economies of my invention will appear from the description to follow. The invention is defined and pointed out in the claims.

A structure which is a preferred embodiment of my invention is illustrated in the accompanying drawing, in which:

Fig. 1 is a perspective view of a clamp embodying the features of my invention applied to parts to be connected.

Fig. 2 is a vertical section of the clamp, connected parts being indicated by dotted lines.

Fig. 3 is a side elevation of a piece of half round stock bent to form a loop or eye merging into a shank, said shank being threaded to receive a nut.

Fig. 4 is a perspective view of a modification.

Fig. 5 is a perspective view of a further modification.

Fig. 6 is a top plan view of a still further modification.

Fig. 7 is a perspective view of a piece of half round stock before bending and threading.

Referring to the drawing, 1 is a piece of half round stock which is bent to form a loop 2 or eye and a split shank 3. The shank 3 is threaded at 4 to receive the nut 5 which is adapted to force the clamping yoke 6 and the loop 2 to clamp the wire members in assembled relation with each other.

The clamping yoke 6 is provided with a central opening 10 in the web 11 for the passage of the shank 3 and alined recesses 12 in the ends of its arms 13 for engaging the members to be clamped in opposition to the end of the loop 2. The yoke is arranged on the shank so that the arms 13 are disposed at the sides of the loop 2, the arms being downwardly and inwardly inclined to prevent spreading upon the tightening of the clamping nut 5.

With the parts thus arranged, the wire members 7 and 8 are clamped in assembled relation and are prevented from slipping relative to each other by the clamping yoke 6. The clamping yoke also prevents the clamp from slipping relative to the wire members. It is not absolutely essential that the piece 1 be of full half round stock, inasmuch as I have found that the threaded ends thereof which form the shank may be half oval for facilitating the matching of the threads on the closing of the ends of the piece to form the split shank. In this connection, it is to be understood that I prefer to thread the ends of the half round stock 1 so that when said ends are brought together to form the shank or bolt section, the latter is ready to receive the tightening nut. It is not necessary, therefore, that the portion between the threaded ends be half round.

Referring to Fig. 4, there is illustrated a clamping member 14 having a loop 15 for receiving the members to be clamped, the loop merging into a split shank 16. In this modification, the shank is left unthreaded and the parts are held in assembled relation by bending the halves of the shank outwardly at the upper ends 17 thereof over the collar 18 which is disposed on the shank over the clamping yoke 6. In operation, the ends 17 are brought together, the collar or washer 18 is slipped on the shank 16 and the ends 17 are bent apart and hammered, or forced down over the collar to complete the assembly.

If desired, the clamping member 6 may be omitted, as illustrated by Fig. 5.

If desired, as illustrated by Fig. 6, the washer or collar 19 may be substantially square, as well as the shank 20, the halves 21 of which are substantially rectangular.

It will be apparent to those skilled in the art that my improved clamp is simple and economical in its parts and efficient and effective in operation. Only one nut is used and, if desired, the clamping yoke may be dispensed with, although I prefer to use this part inasmuch as it prevents the clamped members from slipping.

I have illustrated and described my improvements in embodiments which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent is:

1. A clamp comprising a piece of half round stock bent to form a loop merging into a split shank, said shank being threaded to receive a nut, a clamping yoke arranged on said shank and having arms inwardly inclined toward each other at opposite sides of said loop provided with alined recesses facing the end of said loop, and a nut on said shank and acting to move said yoke and said loop in opposite directions into clamping engagement with members extending through said loop.

2. A clamp comprising a piece of stock bent to form a loop merging into a split shank, said shank being threaded to receive a nut, a clamping yoke arranged on said shank and having arms inwardly inclined toward each other at opposite sides of said loop, and a nut on said shank and acting to move said yoke and said loop in opposite directions into clamping engagement with members extending through said loop.

3. A clamp comprising a piece of stock bent to form a loop merging into a split shank, a clamping yoke arranged on said shank to surround the same and having arms inwardly inclined toward each other at opposite sides of said loop, and means on said shank acting to move said yoke and said loop in opposite directions into clamping engagement with members extending through said loop.

HARRY H. FANTE.